US010506049B2

(12) United States Patent
Mitchell et al.

(10) Patent No.: US 10,506,049 B2
(45) Date of Patent: Dec. 10, 2019

(54) SELECTING MEDIA USING VEHICLE INFORMATION

(71) Applicant: Pandora Media, Inc., Oakland, CA (US)

(72) Inventors: Dave Mitchell, Dearborn, MI (US); David Przygoda, Berkeley, CA (US); George Lynch, Farmington, MI (US); Devon Cook, Bloomfield Village, MI (US); Randall McAdory, Rochester Hills, MI (US); Dennis Jackson, Birmingham, MI (US)

(73) Assignee: Pandora Media, LLC, Oakland, CA (US)

( * ) Notice: Subject to any disclaimer, the term of this patent is extended or adjusted under 35 U.S.C. 154(b) by 84 days.

(21) Appl. No.: 15/209,687

(22) Filed: Jul. 13, 2016

(65) Prior Publication Data

US 2017/0134498 A1    May 11, 2017

Related U.S. Application Data

(60) Provisional application No. 62/251,605, filed on Nov. 5, 2015.

(51) Int. Cl.
*G06F 15/16* (2006.01)
*H04L 29/08* (2006.01)
*G06Q 30/02* (2012.01)

(52) U.S. Cl.
CPC ......... *H04L 67/12* (2013.01); *G06Q 30/0201* (2013.01); *H04L 67/303* (2013.01); *H04L 67/306* (2013.01)

(58) Field of Classification Search
CPC ...... H04L 67/12; H04L 67/306; H04L 67/303
See application file for complete search history.

(56) References Cited

U.S. PATENT DOCUMENTS

| 6,829,475 | B1 * | 12/2004 | Lee ..................... H04L 67/306 455/345 |
| 9,783,140 | B2 * | 10/2017 | Brown .................... H04W 4/21 |
| 2008/0249889 | A1 | 10/2008 | Kawakami |
| 2010/0324818 | A1 * | 12/2010 | Gellatly ............. G01C 21/3641 701/431 |
| 2013/0069798 | A1 * | 3/2013 | Jones ..................... G01W 1/02 340/905 |

(Continued)

OTHER PUBLICATIONS

PCT International Search Report and Written Opinion for PCT/US2016/058940, dated Feb. 7, 2017, 8 Pages.

*Primary Examiner* — Richard G Keehn
(74) *Attorney, Agent, or Firm* — Fenwick & West LLP (57) ABSTRACT

A content server provides customized media items to present to a user using vehicle information. The content server receives environmental information, user feedback for presented media items, and vehicle information for an associated vehicle from a client device associated with a user. The client device receives the vehicle information from a vehicle platform of the vehicle. The content server analyzes the environmental information and user feedback to create a user profile for the user. The content server also analyzes the vehicle information to create a vehicle profile for the associated vehicle. Using the user profile and the vehicle profile, the content server selects media items to send to the client device to present to the user.

21 Claims, 6 Drawing Sheets

(56) References Cited

U.S. PATENT DOCUMENTS

| | | |
|---|---|---|
| 2014/0066014 A1 | 3/2014 | Nicholson et al. |
| 2014/0309863 A1 | 10/2014 | Ricci |
| 2015/0133164 A1 | 5/2015 | Song et al. |
| 2015/0135336 A1* | 5/2015 | Arasavelli ............... H04L 67/12 726/29 |
| 2015/0170121 A1 | 6/2015 | Heron et al. |
| 2015/0363986 A1* | 12/2015 | Hoyos ................ G07C 9/00563 340/5.61 |
| 2016/0231134 A1* | 8/2016 | Nguyen Kim ....... G01C 21/367 |
| 2017/0089716 A1* | 3/2017 | Nguyen Kim ..... G01C 21/3638 |

* cited by examiner

SELECTING MEDIA USING VEHICLE INFORMATION

CROSS REFERENCE TO RELATED APPLICATION

This application claims the benefit of U.S. Provisional App. No. 62/251,605, filed Nov. 5, 2015, which is incorporated by reference in its entirety.

BACKGROUND

Field of Disclosure

The present invention generally relates to the delivery of content, and more specifically to providing customized media items to a user using vehicle information associated with that user.

Description of the Related Art

Many users utilize their digital devices to consume media content. For example, a user may use an application on his or her digital device to play a media item (e.g., a song). In some cases, these applications may present the content via a vehicle platform of a vehicle, such as an infotainment computer system of a car. Such an application utilizes the vehicle platform only to present the media. However, vehicle platforms have many different features. By only utilizing the vehicle platform to present media, the applications do not utilize any other potential features of the vehicle platform.

SUMMARY

The above and other needs are met by a computer-implemented method, a non-transitory computer-readable storage medium storing executable code, and a device for selecting media items to present to a user using vehicle information.

One embodiment of the computer-implemented method for selecting media items to present to a user using vehicle information is described. The method includes receiving vehicle information describing a vehicle in communication with a client device associated with a user. The method further includes analyzing the vehicle information to create a vehicle profile for the associated vehicle. The method additionally includes selecting one or more media items to send to the client device for presentation to the user based on a user profile describing the user and the vehicle profile.

One embodiment of a non-transitory computer-readable storage medium storing executable computer program instructions for selecting media items to present to a user using vehicle information is described. The computer program instructions are executable to perform steps. The steps include receiving vehicle information describing a vehicle in communication with a client device associated with a user. The steps further include analyzing the vehicle information to create a vehicle profile for the associated vehicle. The steps additionally include electing one or more media items to send to the client device for presentation to the user based on a user profile describing the user and the vehicle profile.

One embodiment of a computer system for selecting media items to present to a user using vehicle information is described. The system includes a computer processor for executing computer program instructions. The system also includes a non-transitory computer-readable storage medium storing computer program instructions executable by the processor to perform steps. The steps include receiving vehicle information describing a vehicle in communication with a client device associated with a user. The steps further include analyzing the vehicle information to create a vehicle profile for the associated vehicle. The steps additionally include electing one or more media items to send to the client device for presentation to the user based on a user profile describing the user and the vehicle profile.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
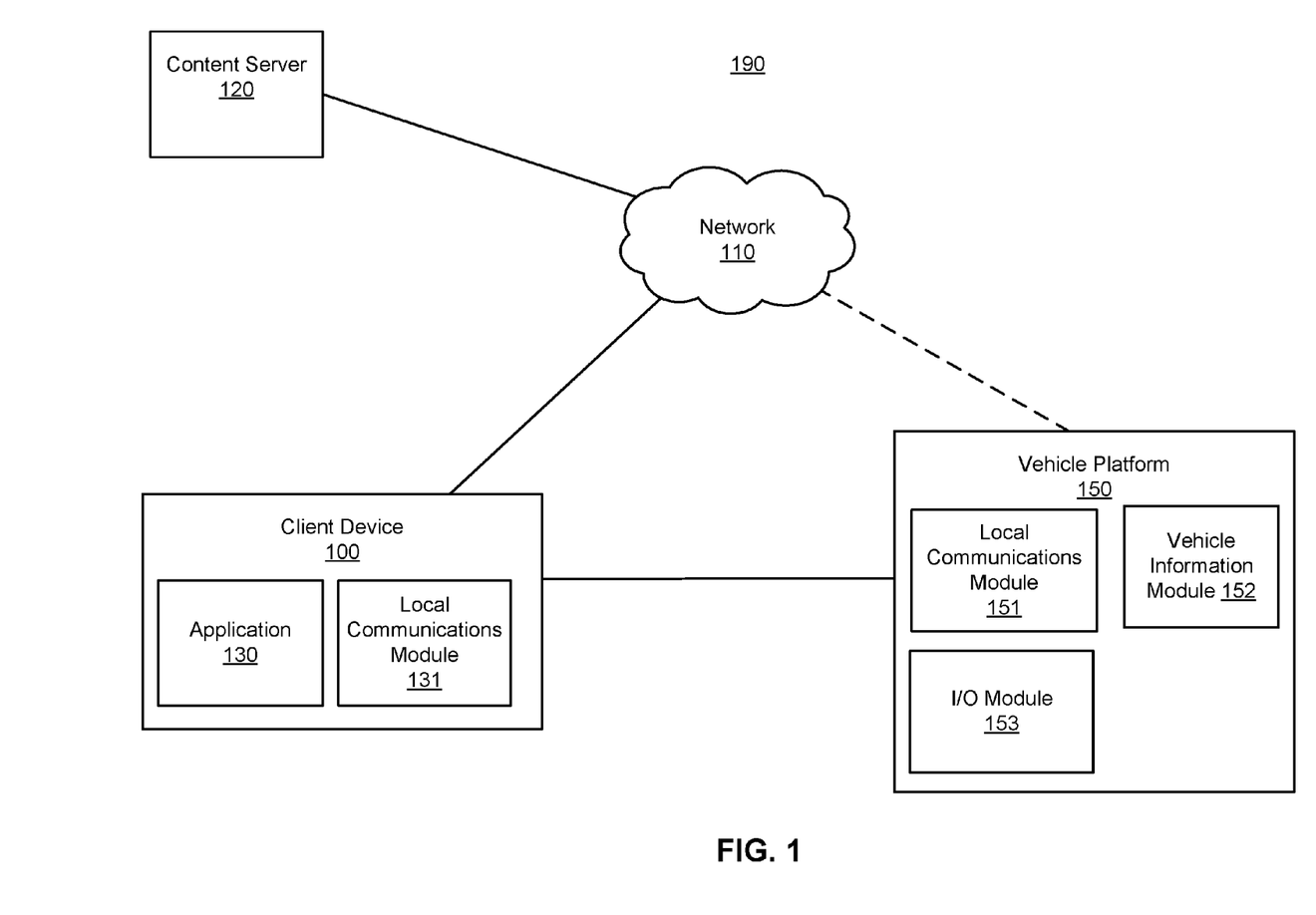
FIG. 1 is a high-level block diagram illustrating an embodiment of an environment for selecting media items based on vehicle information.

FIG. 1 is a high-level block diagram illustrating an embodiment of an environment for selecting media items using vehicle information. The environment includes a client device 100 connected by a network 110 to a content server 120. Here only one client device 100 and content server 120 are illustrated but there may be multiple instances of each of these entities. For example, there may be thousands or millions of client devices 100 in communication with one or more content servers 120.

The network 110 provides a communication infrastructure between the client devices 100 and the content servers 120. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The client devices 100 are computing devices such as smartphones with an operating system such as ANDROID® or APPLE® IOS®, tablet computers, electronic stereos in automobiles or other vehicles, or any other type of network-enabled device on which digital content may be listened to or otherwise experienced. Typical client devices 100 include the hardware and software needed to input and output sound (e.g., speakers and microphone) and images, connect to a wide area network 110 (e.g., via Wi-Fi and/or 4G or other wireless telecommunication standards), determine the current geographic location of the client devices 100 (e.g., a Global Positioning System (GPS) unit), and/or detect motion of the client devices 100 (e.g., via motion sensors such as accelerometers and gyroscopes).

In addition to being able to connect to a wide area network (e.g., the Internet), the client device 100 also includes a local communications module 131 that communicates using a wireless or wired connection with devices that are within a certain physical range. Examples of wired connections include Universal Serial Bus (USB), High Definition Multimedia Interface (HDMI), analog audio, optical connections, and so on. Examples of wireless connections include Bluetooth, WiFi Direct, Zigbee (IEEE 802.15.4), and so on. In one embodiment, the local communications module 131 performs a handshake procedure with another device to connect, or "pair" with the other device. The local communications module 131 retrieves the network address (e.g., Bluetooth media access control (MAC) address) of the other device during the handshake process.

The client device 100 includes an application 130 that allows interaction with the content server 120. For example, the application 130 could be a browser that allows a user of the client device 100 to obtain content by browsing a web site of the content server 120. As another example, the application 130 could be a dedicated application specifically designed (e.g., by the entity responsible for the content server 120) to enable interactions with the content server 120 and its content.

In one embodiment, the application 130 presents media items, responsive to a user selecting and/or creating a particular media channel. A media channel is a playlist of media items that are grouped together, where the media items share one or more common media features. A media item is a form of media content and is characterized by a set of media features that describe musicological features of the item (e.g., gender of singer, tempo, style). In one particular embodiment, the media item is audio content, such as a song, piece of music, or audio recording. It is appreciated, however, that in other embodiments a media item alternatively and/or additionally include other forms of digital content, such as a video, movie, slideshow, or image. Thus, subsequent references to the media item or other audio-related terminology could equally apply to (for example) viewing videos or otherwise experiencing media provided by the content server 120 in other embodiments. The application 130 requests content associated with the requested media channel from the content server 120. The application 130 receives media items (e.g., the media item is streamed) associated with the requested media channel and presents the media items to the user.

In one embodiment, the application 130 collects user feedback and environmental information from the client device 100 presenting the media items. The user feedback may include express feedback and/or implicit feedback. Express feedback is feedback provided by the user that directly expresses the user's preferences (i.e., like or dislike) for a media item. For example, express feedback may be a user rating of a media item, a user selecting a thumbs up icon or thumbs down icon to respectively indicate approval or disapproval, or some other action by the user that directly expresses his/her preference for a media item. In contrast, implicit feedback is feedback that implicitly describes a user's preferences for a media item. Implicit feedback may be positive or negative. Examples of positive implicit feedback include allowing a media item to play through until completion, sharing a media channel with another user of the content server 120, purchasing a media item that is being presented, and adding a media channel based on the media item. Examples of negative implicit feedback include the user skipping a media item after partial playback of the media item, pausing presentation of a media item, and changing a media channel during playing of a media item. Additionally, in some embodiments, the application 130 collects sequences of express feedback, implicit feedback, or some combination thereof.

Environmental information is data describing the physical environment of the client device 100 during which the media item is being presented. Environmental information may be, e.g., the type of client device 100 (e.g., personal computer, smart phone, etc.), location of the client device 100, rate of movement of the client device 100, the current time in the local time zone in which the client device is located, or other information describing the surroundings and/or conditions in which the feedback is collected. The application 130 provides the collected feedback and associated environmental information to the content server 120.

In one embodiment, the application 130 can communicate with a vehicle platform, such as vehicle platform 150, to send media items to the vehicle platform such that vehicle platform can present these media items to a user of the vehicle platform 150. In one embodiment, the application 130 can also receive vehicle information from the vehicle platform 150. The application 130 communicates with the vehicle platform using the local communications module 131.

The content server 120 generates media channels that are specific to a user of the client device 100. The content server 120 may initially generate a media channel based on a seed input from the user (e.g., name of a song or band) using a list of global media items associated with the input. The content server 120 receives requests for content from the client devices 100. The content server 120 identifies a media channel associated with the request for content, and streams media items associated with the media channel to the requesting client device 100.

The content server 120 receives user feedback, environmental information, and vehicle information from the application 100. The content server 120 analyzes the user and environmental information, as well as the vehicle information, in order to select a customized media item to be sent to the application 100 based on this information.

The vehicle platform 150 is a component in a vehicle, such as an automobile, truck, or motorcycle, that is able to transport people and/or cargo. The vehicle platform 150 generally represents the computerized interface into the vehicle. The vehicle platform 150 collects vehicle information and provides the information to the client device 100. The vehicle platform 150 also receives media items from the client device 100 and presents these items to a user of the vehicle.

The vehicle platform 150 includes a local communications module 151 that communicates with the client device 100 via a wired or wireless connection. In one embodiment, the communications methods and protocols supported by the local communications module 151 are the same as the local communications module 131 of the client device 100. For example, the local communications module 151 can communicate with the client device 100 using the Bluetooth protocol.

The vehicle platform 150 includes an input/output (I/O) module 153 that provides input from and output to a user of the vehicle coupled to the vehicle platform 150. The I/O module 153 may be coupled to one or more input devices to receive input from the user. Examples of input devices include physical and capacitive instrumentation (e.g., buttons, levers, dials), a wireless remote controller, a touchscreen input, a microphone, and so on. The I/O module 153 may receive from the user input information such as a destination for a navigation system, a phone number to call, audio input for a phone call, a selection of a temperature, and so on. Examples of output devices include a touchscreen display, speakers, heads up display, projectors, dashboard indicators (e.g., warning information indicators, speedometer), a portable display on a key fob, and so on. The I/O module 153 may output to the output devices information such as the current location, a map display, audio from a phone call, warning information regarding the car, temperature information, and so on.

In one embodiment, the I/O module 153 outputs data received from and provided by the application 130. This data may include a display of a user interface (UI) for presentation of media items, and the presentation of the media items themselves. The I/O module 153 may also receive user feedback via input from the user, such as via the use of an interface on a touchscreen, related to the media items that are presented as described above. This information may be sent to the application 130.

The vehicle platform 150 also includes a vehicle information 152 module that collects and stores vehicle information describing the vehicle coupled to the vehicle platform 150. The vehicle information module 152 may categorize vehicle information into priority levels, such as high priority, medium priority, and low priority. The vehicle information module 152 may also categorize vehicle information into types, such as service reminders, error messages, warning messages, and informational messages.

The priority category that the vehicle information module 152 assigns to a particular item of vehicle information may depend on the urgency with which a user is expected to address the issue. For example, information regarding a braking or engine system may receive a high priority categorization from the vehicle information module 152. As another example, an issue with the air conditioning system may receive only a low priority categorization from the vehicle information module 152 as it does not affect the safety of the user. Examples of where the vehicle information module 152 may categorize vehicle information as high priority may include vehicle information related to engine issues, brake system issues, tire failure, transmission issues, collision detection system warnings, system overheating issues, a service overdue indicator, safety system (e.g., airbag) issues, and so on. Examples of where the vehicle information module 152 may categorize vehicle information as lower priority (e.g., medium or low priority) may include vehicle information related to air conditioning system errors, cruise control state, vehicle speed information, service due notifications, a vehicle transmission state (e.g., four wheel drive, reverse), altitude indication, location indication, and so on.

The vehicle information module 152 may categorize vehicle information into different types depending on the purpose of the vehicle information. Vehicle information types may include service reminders, error messages, warning messages, and informational messages. Service reminders indicate to the user that service is due soon or is overdue for the vehicle. Service reminders may include reminders for events such as oil changes, tune ups, tire rotations, and so on. Error messages may indicate an immediate issue with a component of the vehicle that is causing that component to fail. Examples of error messages may include a battery failure indication, a fuel pump failure indication, an overheating indication, an air conditioning failure indication, a headlight failure indication, and so on. Warning messages may indicate an imminent or anticipated issue with a component of the vehicle that will likely lead to failure. Examples of warning messages may include a low oil or fluid indication, a high temperature indication, a low battery voltage indication, and so on. Informational messages provide information to a user of the vehicle and may not necessarily indicate any issues with the vehicle. Examples of informational messages may include a vehicle speed indication, a vehicle location indication, a vehicle features indication, an outside temperature indication, an indication from a rain sensor indicating the presence of rain, an external light level indication, an indication of air conditioning settings, and so on.

The vehicle information module 152 may collect information from the coupled vehicle at different rates depending on the priority and type of the message. For example, the vehicle information module 152 may retrieve error messages that are categorized as high priority with greater frequency than service reminders. Although certain types and priorities of vehicle information are listed here, other embodiments can have different types and/or priorities of vehicle information.

In one embodiment, the client device 100 with the application 130 connects to the vehicle platform, retrieves vehicle information, and sends this information to the content server 120. The content server 120 uses the vehicle information, along with other information such as environmental and user feedback, to select media items to present to the user associated with the client device 100. The content server 120 provides the selected media items to the client device 100, and the application 130 presents the media items to the user via the client device 100 and/or the vehicle platform 150. Using vehicle information to select the media items allows for the user to receive media items and other information relevant to the vehicle via the application 130 and also improves the relevance of media items selected for the user.

Figure 2:
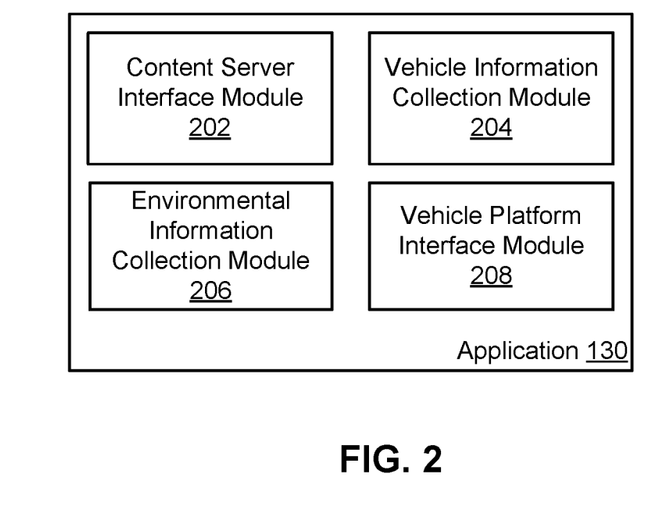
FIG. 2 is a high-level block diagram illustrating a detailed view of modules within the application of FIG. 1, according to one embodiment.

FIG. 2 is a high-level block diagram illustrating a detailed view of modules within the application 130 of FIG. 1, according to one embodiment. As illustrated, the application 130 is comprised of modules including a content server interface module 202, a vehicle information collection module 204, an environmental information collection module 206, and a vehicle platform interface module 208. Some embodiments of the content server 120 have different modules than those described here. Similarly, the functions can be distributed among the modules in a different manner than is described here.

The application 130 includes a vehicle platform interface module 208 that sends output to and receives input from the vehicle platform 150. In one embodiment, the vehicle platform interface module 208 sends media items (e.g., audio data) to the vehicle platform 150 via the local communications module 131 of the client device 100 such that the vehicle platform 150 presents these media items to the user (e.g., via a speaker). In one embodiment, the vehicle platform interface module 208 sends display elements to the vehicle platform 150 via the local communications module 131 of the client device 100 such that the vehicle platform 150 presents these display elements on a display of the vehicle. In one embodiment, the vehicle platform interface module 208 receives input from the vehicle platform 150, such as a user's touchscreen input indicating feedback for a media item. Depending on the I/O capabilities of the vehicle platform 150, the vehicle platform interface module 208 may send different data to the vehicle platform 150 in a format that is acceptable to the vehicle platform 150.

The application 130 also includes a vehicle information collection module 204 that collects vehicle information from a vehicle platform 150 to which the application 130 is connected. In one embodiment, the vehicle information that is collected may be the same information as the information described above with reference to the vehicle information module 152. However, in other embodiments, the vehicle information collection module 204 may collect more or less information.

The application 130 further includes an environmental information collection module 206 that collects sensor data and other environmental data from the client device 100 (or vehicle) to be sent to the content server 120. As noted above, the client device 100 may include various sensors, such as movement (e.g., accelerometer), position (e.g., compass, gyroscope), location (e.g., GPS), light, temperature, pressure, and so on. The vehicle may also include sensor and environmental data such as location information. This sensor data may be part of the environmental information that is sent to the content server 120. The environmental information collection module 206 may also collect other related data from the client device 100 such as the time of day, network connectivity, network address (e.g., the Bluetooth MAC address), hardware capabilities, and so on.

In one embodiment, as sending all environmental information to the content server 120 may be data intensive or require sensitive personal information to be sent, the environmental information collection module 206 may sanitize, compress, filter out, or otherwise manipulate the data before it is ready to be sent to the content server 120 to prevent the data from uniquely identifying the user or to reduce the amount of bandwidth used.

The application 130 additionally includes a content server interface module 202 that communicates with the content server 120 via the network 110. In one embodiment, the server interface module 202 sends user-related data, vehicle information, and/or environmental information from the client device 100 to the content server 120. In one embodiment, the server interface module 202 receives media items from the content server 120 to be presented to the user.

Figure 3:
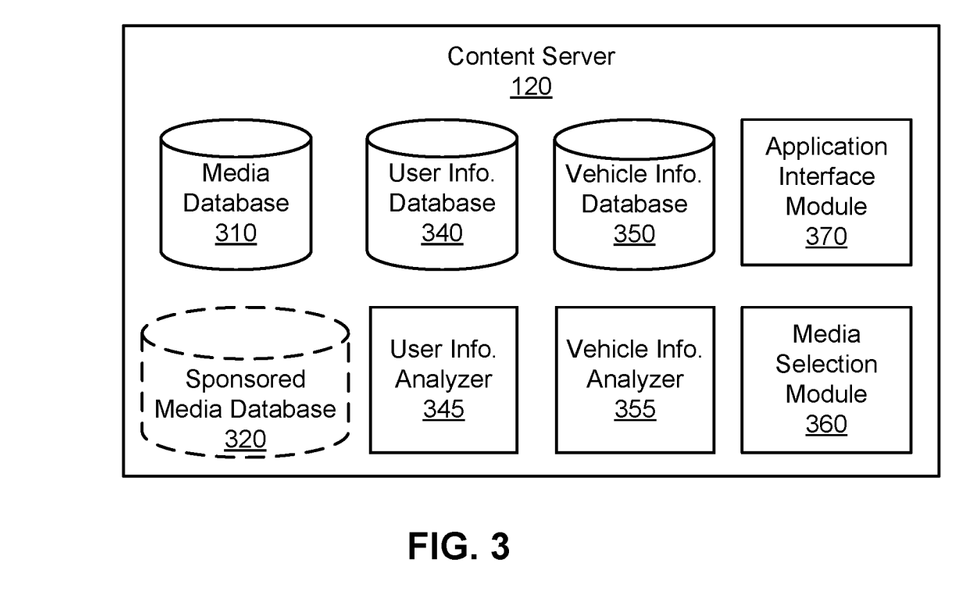
FIG. 3 is a high-level block diagram illustrating a detailed view of the content server of FIG. 1, according to one embodiment.

Turning now to a discussion of the structure of the content server 120, FIG. 3 is a high-level block diagram illustrating a detailed view of modules within the content server 120 according to one embodiment. The content server 120 is comprised of modules including a media database 310, a sponsored media database 320, a user information database 340, a user information analyzer 345, a vehicle information database 350, a vehicle information analyzer 355, a media selection module 360, and an application interface module 370. Some embodiments of the content server 120 have different modules than those described here. Similarly, the functions can be distributed among the modules in a different manner than is described here.

The media database 310 stores information relating to media items, such as the media items and associated metadata (e.g., artist, name of track, etc.), playlists, and mappings of media items to media features. The media features (also referred to as musicological features) describe musicological characteristics of media items. For example, if the media item is a song, the media features of the song may indicate the underlying musicological characteristics of the song such as e.g., the gender of the singer, the type of background vocals, the tempo, the quality of the tones (e.g., pure or distorted), whether the melody dominates the composition, and an amount of gospel influence. A given media item may have many media features, such as 100-500 media features. In one embodiment, the mapping of media items to media features is established using the MUSIC GENOME PROJECT database created by PANDORA MEDIA, INC. of Oakland, Calif.

In some embodiments, the content server 120 includes a sponsored media database 320 storing information related to sponsored media items, such as the sponsored media item itself and associated metadata regarding that sponsored media item. A sponsored media item is a media item that may be presented to a user that is sponsored by a sponsoring entity, such as an advertiser. In return for presenting the sponsored media item to the user, the entity that owns or administers the content server 120 receives a form of compensation from the sponsoring entity. For example, a sponsored media item may be an audio-based advertisement from an advertiser. The sponsored media items stored in the sponsored media database 320 may be of different formats, such as audio files, video files, interactive content, web pages, and so on. Although in some embodiments the sponsored media database 320 is included in the content server 120, in other embodiments the sponsored media database 320 is external to the content server 120.

The user information database 340 stores information received from the application 130 regarding the user and the client device 100. User information may include the user's registration email and gender, as well as any other information (e.g., name, address, payment information) provided by the user to the application 130. User information may also include any implicit or explicit feedback provided by the user to the application 130 regarding various media items that are presented to the user. User information may also include environmental information collected by the environmental information collection module 206.

The user information analyzer 345 analyzes the information stored in the user information database 340 to determine a user profile for the user of the client device 100 that can be used to customize the presentation of media items to the user. Both past and current information may be used to determine the profile information. Thus, the information in the user profile can be used to customize media items based on the current activity and based on long term user information.

The user profile information may include context information and user preferences. The context information describes a context, i.e., certain circumstances or information, regarding the client device 100, and is based on environmental data and/or user information stored in the user information database 340. The context information may include a location/position context, an activity context, a destination context, and any other context based upon environmental data and user information.

A location context indicates a location of the client device 100, which implies the location of the user associated with the client device. The user information analyzer 345 may determine the location context using the environmental information stored in the user information database 340. In one embodiment, the user information analyzer 345 uses the location sensor data from the environmental information to determine the geographic latitude and longitude coordinates of the client device. In this embodiment, the user information analyzer 345 also stores a database of locations, where each location in the database may be identified using a component of a postal address and/or a well-known geographical indicator, such as a street address, the name of an entity (e.g., a business) at the address, a city name, a postal code, a point of interest, a country name, a geographic region, and so on. The user information analyzer 345 then determines, using the stored database of locations, that the location context of the client device 100 is one of the locations in the database that is closest to the geographic coordinates.

An activity context indicates an activity that the user of the client device 100 is likely performing at a current or historical time. In one embodiment, the user information analyzer 345 uses the location history of the client device 100, the current location of the client device, a speed indicator for the client device, the time of day, and/or other environmental information received from the client device 100 to determine the activity context. For example, the user information analyzer 345 may determine that the activity context is the daily commute of the user based on the time of day and the movement location history detected by the client device 100 (i.e., a user on a daily commute would likely take a similar route to the same destination at roughly the same time period). Likewise, the user information analyzer 345 may determine that the activity context is that the user is at work based on the time of day and the location history (i.e., a user who is at a particular location on weekdays for a period of time during the day is likely at work).

The profile information may also include user preferences. The user information analyzer 345 may determine the user preferences based on feedback for media items as described above. Using this feedback information, the user information analyzer 345 may determine a preference score for different media items and/or the metadata associated with those media items. Additionally, the user information analyzer 345 may associate preference scores to certain contexts based on the context of the client device 100 during which the user feedback was provided.

The vehicle information database 350 stores information received from the application 130 regarding the vehicle as collected by the vehicle information collection module 204. Vehicle information may be the same as that described above with reference to the vehicle information module 152.

The vehicle information analyzer 355 analyzes the information stored in the vehicle information database 350 to determine a vehicle profile for the vehicle associated with the vehicle platform 150 that is coupled to the client device 100. In one embodiment, the vehicle profile includes 1) relevant vehicle information as well as 2) predictive information regarding the vehicle.

In one embodiment, the vehicle information analyzer 355 determines that vehicle information is relevant based on the category of the vehicle information. As described above, vehicle information may be categorized into both priority and type. If an item of vehicle information is high priority, then that information may always be deemed relevant. For example, if the vehicle information is a high priority message indicating an error in the brake system of the vehicle, the vehicle information analyzer 355 may always deem this information to be relevant. If the vehicle information is of lower priority, then the vehicle information analyzer 355 may also look at the type of the information to determine whether it is relevant. For example, if the vehicle information is a lower priority message indicating service is due soon, the vehicle information analyzer 355 may determine that although the priority of the message is medium, the message is relevant due to its type (i.e., service notification message). As another example, if the vehicle information is a lower priority message of an informational type, the vehicle information analyzer 355 may not determine that this message is relevant due to its type.

In one embodiment the vehicle information analyzer 355 is also configured to determine that certain items of vehicle information are relevant based on the type of that item of vehicle information. For example, the vehicle information analyzer 355 may determine that items of vehicle information that are of a service notification type are relevant.

In one embodiment, the vehicle information analyzer 355 also predicts potential items of vehicle information based on the collected vehicle information, and in some cases with the addition of user information from the user information store 340. The vehicle information analyzer 355 can predict this vehicle information even if the associated vehicle platform 150 is technologically unable to provide the information (e.g., in the case of an older vehicle). The vehicle information analyzer 355 stores this predicted vehicle information in the vehicle profile.

The vehicle information analyzer 355 predicts additional information about the vehicle using prior stored vehicle information from the vehicle information database 350, patterns in the vehicle information history, and/or predictive models of vehicle operation. For example, the vehicle information analyzer 355 may predict a service notification message for the vehicle based on the odometer information provided by the vehicle platform 150 and stored vehicle information of the recommended service schedule for the vehicle. In another example, the vehicle information analyzer 355 determines that a component of the vehicle is likely to fail based on determining a pattern in the items of vehicle information stored in the vehicle information database 350 that are of the error and/or warning types. The vehicle information analyzer 355 may also model the vehicle based on historical vehicle information and associated user information for similar vehicles to predict that certain events regarding the vehicle are likely to occur.

The media selection module 360 selects which media items to present to the user via the application 130 based on the user profile information and the vehicle profile information determined by the user information analyzer 345 and the vehicle information analyzer 355. The media selection module 360 selects media items for a user from the media database 310 and the sponsored media database 320 based at least on the context and user preferences in the user profile and/or the vehicle information in the vehicle profile for the vehicle associated with that user.

In one embodiment, the media selection module 360 specifically selects sponsored media items from the sponsored media database 320 to be presented to the user interspersed between one or more (unsponsored) media items from the media database 310. The media selection module 360 selects at least some of the sponsored media items for the user based on the vehicle information in the vehicle profile information.

In one embodiment, the media selection module 360 selects a sponsored media item related to a high priority item of vehicle information before selecting a sponsored media item related to a lower priority item of vehicle information. For example, if the vehicle information includes a high priority tire puncture error message and a low priority informational message, the media selection module 360 may select a select a sponsored media item for a local tire repair shop before selecting a sponsored media item related to the low priority message. The media selection module 360 may also assign different priorities to the different types of vehicle information and selects sponsored media items accordingly. In one embodiment, the media selection module 360 prioritizes error messages and warning messages over service notification and informational messages for the purposes of selecting a related sponsored media item.

In another embodiment, the media selection module 360 selects a sponsored media item related to a high priority item of vehicle information and interrupts a media item that is currently being presented with this sponsored media item. In one embodiment, the media item that is currently being presented is a sponsored media item related to an item of vehicle information with a lower priority than the high priority item of vehicle information. The media selection module 360 may select a warning message (i.e., audio and/or visual warning) regarding the high priority item of vehicle information to be presented to the user along with this sponsored media item. When interrupting a media item that is currently being presented, the media selection module 360 may select a shorter length version of the sponsored media item, or a shorter length sponsored media item, so as not to cause a significant disruption.

In one embodiment, one or more media items are assigned priority levels, and the media selection module 360 interrupts a media item of a lower priority that is currently being presented with a media item of a higher priority.

In one embodiment, the media selection module 360 selects a sponsored media item based on a combination of the vehicle information, context, and user preferences. The media selection module 360 may first analyze the vehicle information to select a sponsored media item, and then use the context and user preferences to modify the selection (i.e., selecting sponsored media items related to the vehicle information, and then further selecting one or more of these sponsored media items using the context information). For example, if the vehicle information includes a low fuel informational notification, the media selection module 360 may select a sponsored media item for a gas station that is near the current location context.

In other embodiments, the selection is based on modeling user feedback to selected sponsored media item or the measurement of user response to a selected sponsored media item. For example, if a user provides positive feedback for a selected sponsored media item, the media selection module 360 may further associate that sponsored media item or its type to the user profile and associated vehicle profile. That same sponsored media item may be selected for other users with similar profiles. Alternatively, the media selection module 360 may also receive information regarding a user response to sponsored media items, such as a user interacting with (e.g., by tapping) a sponsored media item to learn about, purchase, or perform another action for whatever is being promoted in the sponsored media item. The media selection module 360 may then further associate that sponsored media item with user and/or vehicle profiles similar to the user who interacted with that sponsored media item.

The application interface module 370 communicates data to and from the application 130. The application interface module 370 receives vehicle information from the application 130 and sends it to the vehicle information database 350. The application interface module 370 receives environmental information, user feedback, and user information from the application 130 and sends these to the user information database 340. The application interface module 370 also sends the media items selected by the media selection module 360 along with any instructions regarding how to present the media items to the application 130.

Figure 4:
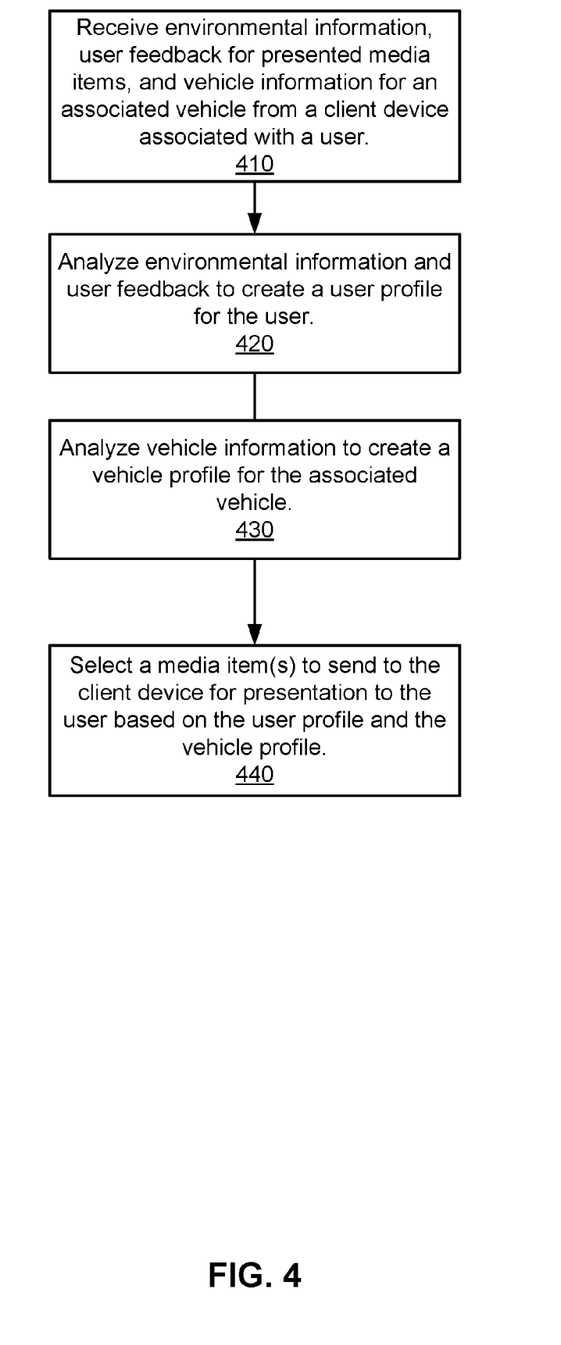
FIG. 4 is a flowchart illustrating a process of selecting a media item to present to the user using vehicle information, according to one embodiment.

FIG. 4 is a flowchart illustrating a process of selecting a media item to present to the user using vehicle information according to one embodiment. In one embodiment, the process of FIG. 4 is performed by the content server 120. Other entities may perform some or all of the steps of the process in other embodiments. Likewise, embodiments may include different and/or additional steps, or perform the steps in different orders.

The content server 120 receives 410 environmental information, user feedback, and vehicle information for an associated vehicle from the client device 100 that is associated with the user. The vehicle information may be provided to the client device 100 by a vehicle platform 150 of the vehicle. The environmental information includes sensor data collected by the client device 100.

The content server 120 analyzes 420 the environmental information and the user feedback to create a user profile for the user. The user profile may include context information that describes the current context for the user, such as where the user is currently located, and what activity the user is performing. The user profile may also include user preferences that score the user's preference for various media items that have been presented to the user.

The content server 120 analyzes 430 the vehicle information to create a vehicle profile for the associated vehicle. The associated vehicle is the vehicle to which the client device 100 is coupled. The vehicle information is categorized based on different priorities and types. The vehicle profile includes relevant vehicle information that is selected based on the priority and/or type of the vehicle information. The vehicle profile may also include predicted vehicle information.

The content server 120 selects 440 a media item to send to the client device 100 based on the user profile and the vehicle profile. The content server 120 may select the media item based on the context and user preferences in the user profile and the vehicle information in the vehicle profile. The content server 120 may select different media items depending on the priority and type of the vehicle information in the vehicle profile, and may modify this selection based on the context and user preferences in the user profile.

Figure 5:
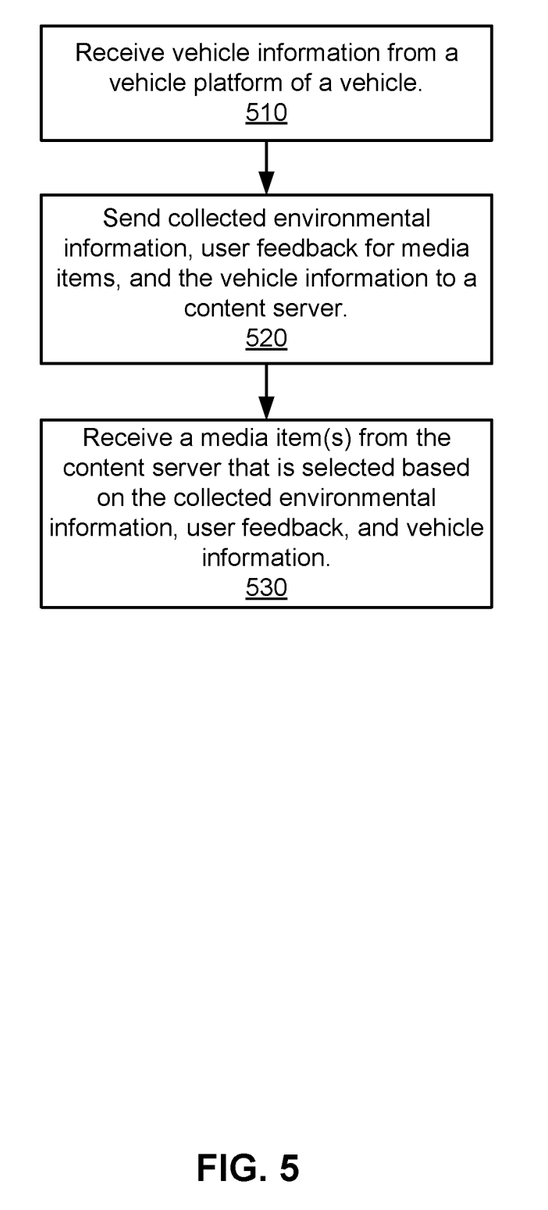
FIG. 5 is a flowchart illustrating a process of receiving a selected media item to present to the user using vehicle information, according to one embodiment.

FIG. 5 is a flowchart illustrating a process of receiving a selected media item to present to the user using vehicle information according to one embodiment. In one embodiment, the process of FIG. 5 is performed by the client device 100. Other entities may perform some or all of the steps of the process in other embodiments. Likewise, embodiments may include different and/or additional steps, or perform the steps in different orders.

The client device 100 receives 510 vehicle information from the vehicle platform 150 of a vehicle. This may be in response to a request made by the client device 100 to the vehicle platform 150 for the vehicle information. As noted, the vehicle information is categorized into different types and priorities.

The client device 100 sends 520 collected environmental information, user feedback for media items, and the vehicle information to the content server 120. The sensor data includes data gathered by the client device 100 via one or more of its hardware components, such as a location sensor, a movement sensor, and so on. The user feedback is data collected from user interaction with presented media items indicating positive, negative, or other favorability of the media item by the user.

The client device 100 receives 530 from the content server 120 a media item that is selected by the content server 120 based on the collected sensor data, user feedback, and vehicle information provided by the client device 100. The selected media item is customized based on the information provided to the content server 120 and may further be presented via an output device of the vehicle platform.

As the vehicle information is provided to the content server 120, the selected media item may relate to the vehicle information sent to the content server 120. For example, a selected media item may be a sponsored media item for an oil change facility if the vehicle information includes a service notification type of message indicating that an oil change is due soon.

Figure 6:
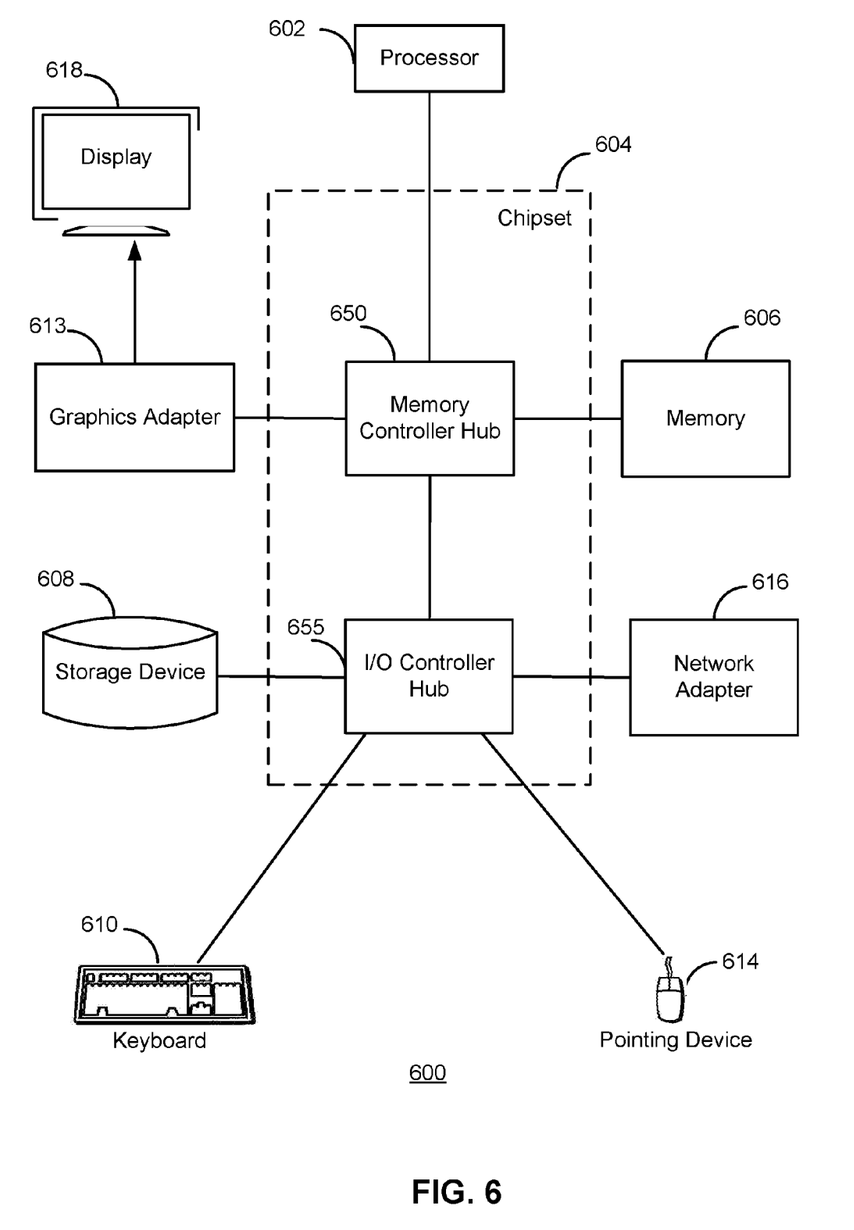
FIG. 6 is a high-level block diagram illustrating an example computer for implementing the entities shown in FIG. 1, according to one embodiment.

Turning now to a discussion of the implementation of client device 100 and/or the content server 120, FIG. 6 is a high-level block diagram illustrating an example computer 600 for implementing the entities shown in FIG. 1. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The input interface 614 is a touch-screen interface, a mouse, track ball, or other type of pointing device, a keyboard, or some combination thereof, and is used to input data into the computer 600. In some embodiments, the computer 600 may be configured to receive input (e.g., commands) from the input interface 614 via gestures from the user. The graphics adapter 612 displays images and other information on the display 618. The network adapter 616 couples the computer 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIG. 1 can vary depending upon the embodiment and the processing power required by the entity. For example, the content server 120 can run in a single computer 600 or multiple computers 600 communicating with each other through a network such as in a server farm. The computers 600 can lack some of the components described above, such as graphics adapters 612, and displays 618.

OTHER CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting content based on correlations between preferred media features and specific configurations of environmental information. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for selecting media items to present to a user using vehicle information, comprising:

receiving, at a content server, vehicle information describing a vehicle in communication with a client device associated with a user;

analyzing the vehicle information to create a vehicle profile for the associated vehicle;

selecting, by the content server, one or more media items including audio content from a media database associated with the content server to stream to the client device from the content server, the one or more media items selected based on a user profile describing the user and the vehicle profile, the client device transmitting the one or more media items to the vehicle for presentation via a media playback device of the vehicle;

receiving user feedback for a selected media item, the user feedback received from the client device, which receives the user feedback from the vehicle, wherein the user feedback is input by the user using a user interface on a display of the vehicle, the user feedback being an indication of a rating of the selected media item by the user; and modifying a selection of the one or more media items based on the user feedback.

2. The method of claim 1, wherein the vehicle profile includes one or more items of vehicle information, and wherein each item of vehicle information is assigned a priority level.

3. The method of claim 2, wherein the selecting one or more media items to stream to the client device based on the user profile and the vehicle profile further comprises:

selecting one or more media items that are related to the one or more items of vehicle information in the vehicle profile such that media items that are related to items of vehicle information with a higher priority level are selected before media items that are related to items of vehicle information with a lower priority level.

4. The method of claim 2, wherein the selecting one or more media items to stream to the client device based on the user profile and the vehicle profile further comprises:

selecting a first media item that is related to an item of vehicle information in the vehicle profile with a first priority level; and interrupting a second media item with a second priority level lower than the first priority level that is currently being presented to the user to present the selected media item.

5. The method of claim 1, wherein each item of the vehicle information is of a particular type, and wherein the analyzing the vehicle information to create a vehicle profile for the associated vehicle further comprises:

responsive to determining that an item of vehicle information is relevant based on the type of the item of vehicle information, including the item of vehicle information in the vehicle profile.

6. The method of claim 5, wherein the vehicle profile includes an item of vehicle information that is of a service notification type, and the media item is selected in relation to the service notification.

7. The method of claim 1, wherein the user profile includes context information describing a context of the client device, and wherein the selecting one or more media items to stream to the client device based on the user profile and the vehicle profile further comprises:

selecting one or more media items that are related to the one or more items of vehicle information in the vehicle profile; and selecting one or more of the selected media items based on the context information.

8. The method of claim 1, wherein the user feedback is a preference of the user for the selected media item.

9. A non-transitory computer-readable storage medium storing executable computer program instructions for selecting media items to present to a user using vehicle information, the instructions executable to perform steps comprising:

receiving, at a content server, vehicle information describing a vehicle in communication with a client device associated with a user;

analyzing the vehicle information to create a vehicle profile for the associated vehicle;

selecting, by the content server, one or more media items including audio content from a media database associated with the content server to stream to the client device from the content server, the one or more media items selected based on a user profile describing the user and the vehicle profile, the client device transmitting the one or more media items to the vehicle for presentation via a media playback device of the vehicle;

receiving user feedback for a selected media item, the user feedback received from the client device, which receives the user feedback from the vehicle, wherein the user feedback is input by the user using a user interface on a display of the vehicle, the user feedback being an indication of a rating of the selected media item by the user; and modifying a selection of the one or more media items based on the user feedback.

10. The computer-readable medium of claim 9, wherein the vehicle profile includes one or more items of vehicle information, and wherein each item of vehicle information is assigned a priority level.

11. The computer-readable medium of claim 10, wherein the selecting one or more media items to stream to the client device based on the user profile and the vehicle profile further comprises:

selecting one or more media items that are related to the one or more items of vehicle information in the vehicle profile such that media items that are related to items of vehicle information with a higher priority level are selected before media items that are related to items of vehicle information with a lower priority level.

12. The computer-readable medium of claim 10, wherein the selecting one or more media items to stream to the client device based on the user profile and the vehicle profile further comprises:

selecting a first media item that is related to an item of vehicle information in the vehicle profile with a first priority level; and interrupting a second media item with a second priority level lower than the first priority level that is currently being presented to the user to present the selected media item.

13. The computer-readable medium of claim 9, wherein each item of the vehicle information is of a particular type, and wherein the analyzing the vehicle information to create a vehicle profile for the associated vehicle further comprises:

responsive to determining that an item of vehicle information is relevant based on the type of the item of vehicle information, including the item of vehicle information in the vehicle profile.

14. The computer-readable medium of claim 13, wherein the vehicle profile includes an item of vehicle information that is of a service notification type, and the media item is selected in relation to the service notification.

15. The computer-readable medium of claim 9, wherein the user profile includes context information describing a context of the client device, and wherein the selecting one or more media items to stream to the client device based on the user profile and the vehicle profile further comprises:
- selecting one or more media items that are related to the one or more items of vehicle information in the vehicle profile; and
- selecting one or more of the selected media items based on the context information.

16. A computer system for selecting media items to present to a user using vehicle information, comprising:
- a computer processor for executing computer program instructions; and
- a non-transitory computer-readable storage medium storing computer program instructions executable by the processor to perform steps comprising:
  - receiving, at a content server, vehicle information describing a vehicle in communication with a client device associated with a user;
  - analyzing the vehicle information to create a vehicle profile for the associated vehicle;
  - selecting, by the content server, one or more media items including audio content from a media database associated with the content server to stream to the client device from the content server, the one or more media items selected based on a user profile describing the user and the vehicle profile, the client device transmitting the one or more media items to the vehicle for presentation via a media playback device of the vehicle;
  - receiving user feedback for a selected media item, the user feedback received from the client device, which receives the user feedback from the vehicle, wherein the user feedback is input by the user using a user interface on a display of the vehicle, the user feedback being an indication of a rating of the selected media item by the user; and
  - modifying a selection of the one or more media items based on the user feedback.

17. The system of claim 16, wherein the vehicle profile includes one or more items of vehicle information, and wherein each item of vehicle information is assigned a priority level.

18. The system of claim 17, wherein the selecting one or more media items to stream to the client device based on the user profile and the vehicle profile further comprises:
- selecting one or more media items that are related to the one or more items of vehicle information in the vehicle profile such that media items that are related to items of vehicle information with a higher priority level are selected before media items that are related to items of vehicle information with a lower priority level.

19. The system of claim 17, wherein the selecting one or more media items to stream to the client device based on the user profile and the vehicle profile further comprises:
- selecting a first media item that is related to an item of vehicle information in the vehicle profile with a first priority level; and
- interrupting a second media item with a second priority level lower than the first priority level that is currently being presented to the user to present the selected media item.

20. The system of claim 16, wherein each item of the vehicle information is of a particular type, and wherein the analyzing the vehicle information to create a vehicle profile for the associated vehicle further comprises:
- responsive to determining that an item of vehicle information is relevant based on the type of the item of vehicle information, including the item of vehicle information in the vehicle profile.

21. The system of claim 16, wherein the vehicle profile includes an item of vehicle information that is of a service notification type, and the media item is selected in relation to the service notification.

* * * * *